United States Patent
Partridge et al.

(12) 
(10) Patent No.: US 12,083,368 B2
(45) Date of Patent: Sep. 10, 2024

(54) AIRCRAFT FIRE SUPPRESSION SYSTEM

(71) Applicant: BOMBARDIER INC., Dorval (CA)

(72) Inventors: Grant Partridge, Brampton (CA); Andreas Gekeler, Montreal (CA); Boris Meislitzer, Pointe-Claire (CA); Vinodkumar G. Mistry, Brampton (CA); Julio Omar Checa Santamaria, Montreal (CA); Juan Carlos Restrepo, Montreal (CA); Zaharias Kripotos, Pincourt (CA)

(73) Assignee: BOMBARDIER INC., Dorval (CA)

( * ) Notice: Subject to any disclaimer, the term of this patent is extended or adjusted under 35 U.S.C. 154(b) by 711 days.

(21) Appl. No.: 16/760,972

(22) PCT Filed: Nov. 2, 2018

(86) PCT No.: PCT/IB2018/058633
§ 371 (c)(1),
(2) Date: May 1, 2020

(87) PCT Pub. No.: WO2019/087147
PCT Pub. Date: May 9, 2019

(65) Prior Publication Data
US 2020/0298036 A1      Sep. 24, 2020

(51) Int. Cl.
*A62C 3/08* (2006.01)
*A62C 35/68* (2006.01)
(Continued)

(52) U.S. Cl.
CPC ............... *A62C 3/08* (2013.01); *A62C 35/68* (2013.01); *A62C 99/0027* (2013.01); *B64C 1/22* (2013.01);
(Continued)

(58) Field of Classification Search
CPC ....... A62C 3/08; A62C 35/68; A62C 99/0009; A62C 99/0018; A62C 99/0027;
(Continued)

(56) References Cited

U.S. PATENT DOCUMENTS

| 4,351,394 A | 9/1982 | Enk |
| 4,566,542 A | 1/1986 | Enk et al. |

(Continued)

OTHER PUBLICATIONS

International Search Report and Written Opinion, PCT/IB2018/058633, Feb. 7, 2019.

*Primary Examiner* — Tuongminh N Pham
*Assistant Examiner* — Juan C Barrera
(74) *Attorney, Agent, or Firm* — NORTON ROSE FULBRIGHT CANADA LLP (57) ABSTRACT

An aircraft including a fuselage defining a cabin and baggage bay, engine compartments for receiving engines, an auxiliary power unit compartment for receiving an auxiliary power unit, and a fire suppression system including first and second reservoirs containing a fire suppressant. The reservoirs are each connected to all of the engine compartments for distribution of the fire suppressant thereto. The first reservoir is connected to only one of the auxiliary power unit compartment and baggage bay, and the second reservoir is connected to only the other of the auxiliary power unit compartment and baggage bay. A fire suppression system for an aircraft and a method of connecting a fire suppression system of an aircraft are also discussed.

7 Claims, 4 Drawing Sheets

(51) Int. Cl.
    *A62C 99/00*         (2010.01)
    *B64C 1/22*          (2006.01)
    *B64D 25/00*         (2006.01)
    *B64D 45/00*         (2006.01)

(52) U.S. Cl.
    CPC ........ *B64D 25/00* (2013.01); *B64D 2045/009* (2013.01)

(58) Field of Classification Search
    CPC ....... A62C 35/023; A62C 35/13; A62C 35/64; A62C 13/76; A62C 35/00–68; B64D 25/00; B64D 2045/009; B64C 1/22
    USPC ...................................................... 244/129.2
    See application file for complete search history.

(56) References Cited

U.S. PATENT DOCUMENTS

| | | | |
|---|---|---|---|
| 5,183,116 A | | 2/1993 | Fleming |
| 6,935,433 B2* | | 8/2005 | Gupta ................ A62C 99/0018 169/46 |
| 8,678,101 B2* | | 3/2014 | Gatsonides ............ A62C 35/02 169/61 |
| 8,925,865 B2 | | 1/2015 | Stolte et al. |
| 2011/0308823 A1 | | 12/2011 | Seebaluck et al. |
| 2017/0014656 A1* | | 1/2017 | Smith ..................... B64C 19/00 |
| 2019/0022440 A1* | | 1/2019 | Chattaway ............. A62C 35/68 |

\* cited by examiner

AIRCRAFT FIRE SUPPRESSION SYSTEM

CROSS-REFERENCE TO RELATED APPLICATIONS

This application is a national phase entry of PCT/IB2018/058633 filed Nov. 2, 2018 which claims priority to U.S. provisional patent application Ser. No. 62/581,118 filed on Nov. 3, 2017, the entire contents of each of which are incorporated by reference herein.

TECHNICAL FIELD

The application relates generally to aircraft and, more particularly, to fire suppression systems used in aircraft.

BACKGROUND

Aircraft have fire suppression systems configured to extinguish fire that might occur in different zones, such as engine compartments, an auxiliary power unit compartment, and pressurized or unpressurized cargo compartments. An example of such fire suppression systems includes several reservoirs each being connected to all of the compartments for redundancy purposes. Such fire suppression systems can be complex and/or heavy.

SUMMARY

In an aspect, there is provided an aircraft comprising: a fuselage defining a cabin and a baggage bay; engine compartments for receiving engines; an auxiliary power unit compartment for receiving an auxiliary power unit; and a fire suppression system including first and second reservoirs containing a fire suppressant, the first and second reservoirs each connected to all of the engine compartments for distribution of the fire suppressant to the engine compartments, the first reservoir connected to only one of the auxiliary power unit compartment and baggage bay for distribution of the fire suppressant thereto, the second reservoir connected to only the other of the auxiliary power unit compartment and baggage bay for distribution of the fire suppressant thereto.

In an embodiment, the baggage bay is connected to the second reservoir through a restrictor configured for lowering a pressure of the fire suppressant circulating therethrough.

In an embodiment, the baggage bay is accessible from within the cabin and configured to be pressurized during flight.

In an embodiment, a volume of the baggage bay is at least 200 cubic feet.

In an embodiment, the fire suppression system further comprising first and second fittings, each of the first and second fitting having a first inlet connected to the first reservoir, a second inlet connected to the second reservoir, and an outlet connected to a respective one of the engine compartments.

In an embodiment, the first and second reservoirs each have a first outlet connected to one of the engine compartments, a second outlet connected to another of the engine compartments, and a third outlet, the third outlet of the first reservoir connected to the auxiliary power unit compartment, the third outlet of the second reservoir connected to the baggage bay.

In an embodiment, the aircraft further comprises a pressure-relief valve having an inlet connected to the baggage bay and an outlet connected to a region outside the baggage bay, the pressure-relief valve having an opened configuration and a closed configuration, the pressure-relief valve defining a fluid flow communication between the baggage bay and the region in the opened configuration and blocking the fluid flow communication between the baggage bay and the region in the closed configuration.

In an embodiment, the baggage bay is fluidly connected to the second reservoir through spaced apart nozzles in fluid communication with the baggage bay.

In another aspect, there is provided a fire suppression system for an aircraft, comprising: first, second, third, and fourth fire zones, an air pressure in the first and the second fire zones less than an air pressure in the fourth fire zone; first and second reservoirs each containing a fire suppressant and each having a first outlet fluidly connected to the first fire zone, a second outlet fluidly connected to the second fire zone, and a third outlet, the third outlet of the first reservoir fluidly connected to the third fire zone, the third outlet of the second reservoir fluidly connected to the fourth fire zone; wherein the third fire zone is fluidly separated from the second reservoir and the fourth fire zone is fluidly separated from the first reservoir.

In an embodiment, the fourth fire zone is connected to the third outlet of the second reservoir through a restrictor configured for lowering a pressure of the fire suppressant circulating therethrough.

In an embodiment, the fire suppression system further comprises a first fitting and a second fitting, the first and second fittings each having a first inlet connected to the first reservoir, a second inlet connected to the second reservoir, and an outlet connected to a respective one of the first and second fire zones.

In an embodiment, the fourth fire zone is connected to the third outlet of the second reservoir through spaced apart nozzles in fluid communication with the fourth fire zone.

In an embodiment, the fire suppression system further comprises a pressure-relief valve having an inlet connected to the fourth fire zone and an outlet connected to a region around the fourth fire zone, the pressure-relief valve having an opened configuration and a closed configuration, the pressure-relief valve allowing fluid flow communication between the fourth fire zone and the region through the pressure-relief valve in the opened configuration and blocking fluid flow communication therebetween in the closed configuration.

In an embodiment, a volume of the fourth fire zone is at least 200 cubic feet.

In an embodiment, the fourth fire zone is accessible from within a cabin of the aircraft and configured to be pressurized during flight.

In yet another aspect, there is provided a method of connecting a fire suppression system of an aircraft having engine compartments, an auxiliary power unit compartment and a baggage bay, the method comprising: fluidly connecting each of the engine compartments to first and second reservoirs of fire suppressant; fluidly connecting the auxiliary power unit compartment to the first reservoir without fluidly connecting the auxiliary power unit compartment to the second reservoir; and fluidly connecting the baggage bay to the second reservoir without fluidly connecting the baggage bay to the first reservoir.

In an embodiment, the first and second reservoirs have each first, second, and third outlets, wherein the method further comprises: connecting one of the engine compartments to the first outlets of the first and second reservoirs; connecting another one of the engine compartments to the second outlets of the first and second reservoirs; connecting the auxiliary power unit compartment to the third outlet of the first reservoir; and connecting the baggage bay to the third outlet of the second reservoir.

In an embodiment, fluidly connecting the baggage bay to the second reservoir includes fluidly connecting the baggage bay to the second reservoir via a restrictor for lowering a pressure of the fire suppressant circulating from the second reservoir to the baggage bay.

In an embodiment, fluidly connecting the baggage bay with the second reservoir includes connecting the second reservoir with nozzles in fluid communication with the baggage bay.

In an embodiment, the method further comprises providing a selective fluid communication between a region around the baggage bay for limiting a pressure increase in the baggage bay when the second reservoir circulates the fire suppressant to the baggage bay.

DESCRIPTION OF THE DRAWINGS

For a better understanding of the present disclosure, as well as other aspects and further features thereof, reference is made to the following description which is to be used in conjunction with the accompanying drawings, where.

In the drawings, embodiments are illustrated by way of example. It is to be expressly understood that the description and drawings are only for purposes of illustration and as an aid to understanding. They are not intended to be a definition of the limits of the disclosure.

DETAILED DESCRIPTION

Figure 1:
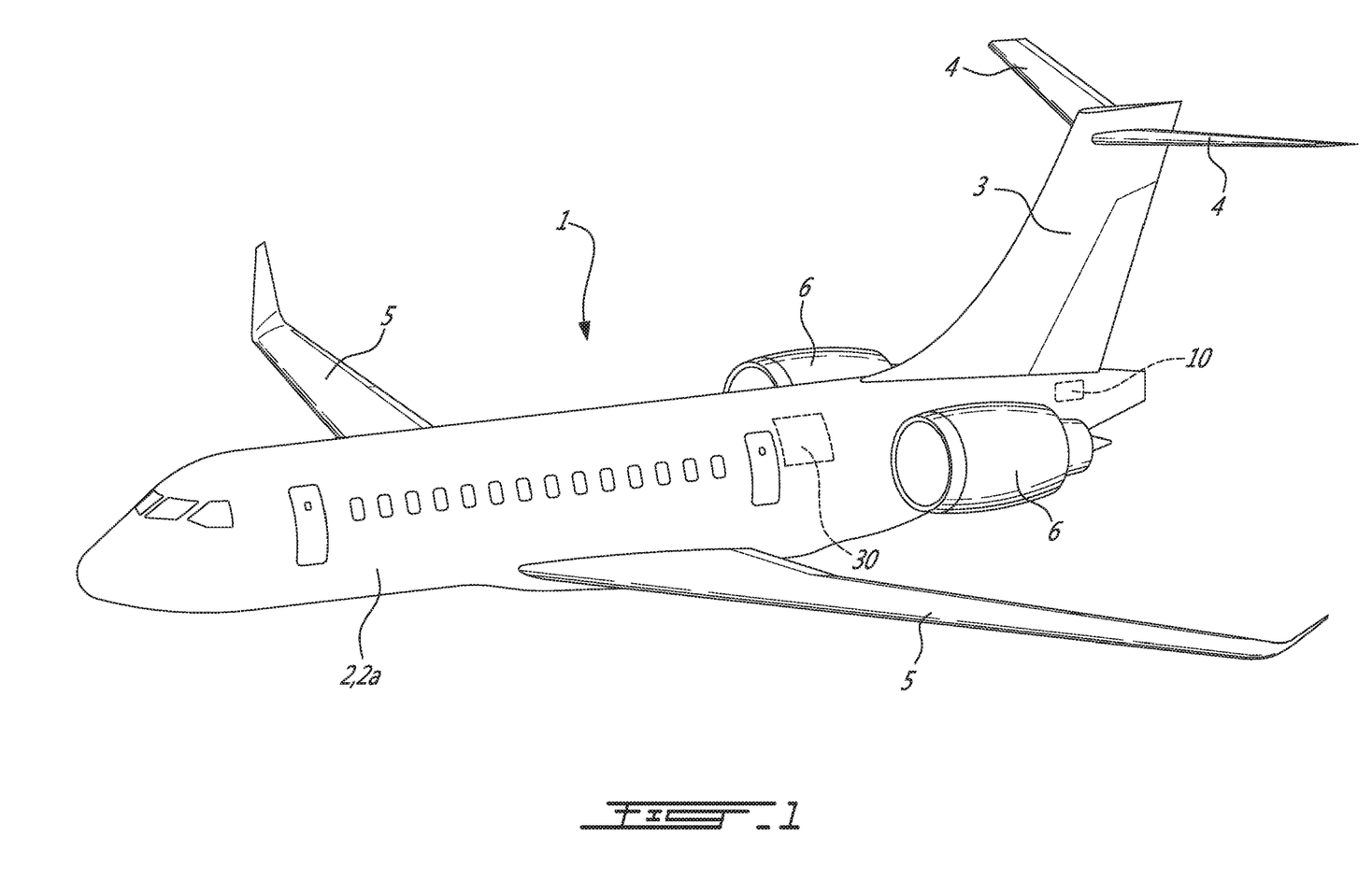
FIG. 1 is a schematic tridimensional view of an aircraft.

Referring to the drawings and more particularly to FIG. 1, an aircraft is shown at 1, and is generally described to illustrate some components for reference purposes in the present disclosure. The aircraft 1 has a fuselage 2 defining a cabin 2a for receiving passengers. The fuselage 2 has a fore end at which a cockpit is located, and an aft end supporting a tail assembly, with the cabin 2a generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform T-tail, etc. Wings 5 project laterally from the fuselage. The aircraft 1 has engines 6 mounted to the fuselage 2 in the depicted embodiment, although for other aircraft they can be supported by the wings 5. An auxiliary power unit 10 is located at the aft end of the aircraft 1. The aircraft 1 is shown as a jet-engine aircraft, but may also be a propeller aircraft. It is also understood that although FIG. 1 shows a business aircraft, the aircraft 1 may alternately be any other type of aircraft, including, but not limited to, a commercial aircraft or a private aircraft. The aircraft further includes a baggage bay 30, which in a particular embodiment is located within the cabin 2a and accessible by the passengers from the cabin 2a during flight.

Figure 2:
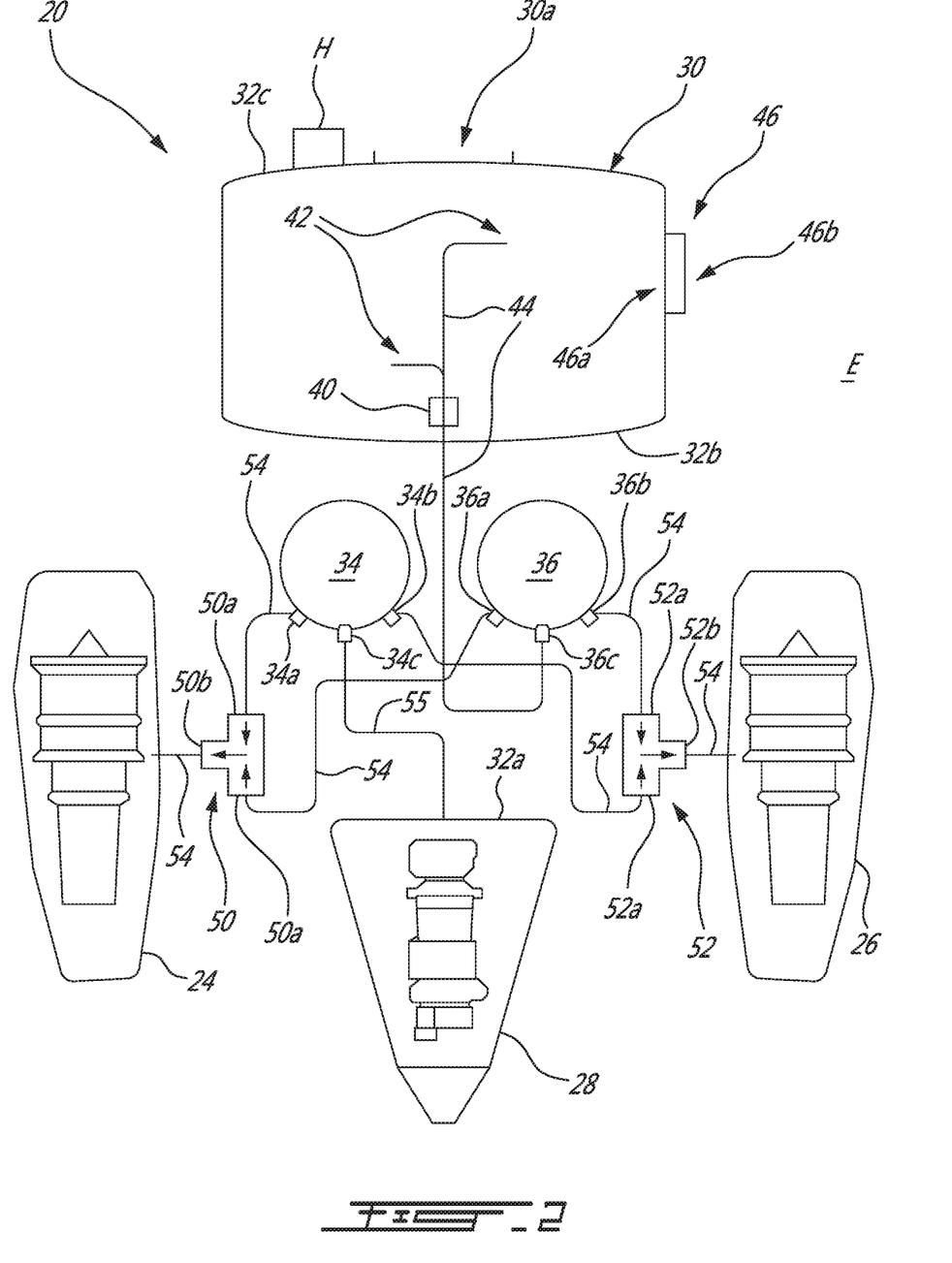
FIG. 2 is a schematic top view of a fire suppression system of the aircraft of FIG. 1 in accordance with a particular embodiment.

Referring now to FIG. 2, the aircraft 1 further includes a fire suppression system 20 configured for extinguishing a fire that may occur in different fire zones of the aircraft 1, i.e. zones including components susceptible of starting a fire and for which fire suppression must be provided, for example to comply with regulations. In the embodiment shown, the fire zones include a first engine compartment 24 receiving one of the two main engines 6, a second engine compartment 26 receiving the other of the two main engines 6, an auxiliary power unit compartment 28 receiving the auxiliary power unit (APU) 10, and the baggage bay 30 within the cabin 2a. In the embodiment shown, the engine compartments 24, 26 are defined by nacelles disposed around the main engines 6, and connected to the fuselage 2; it is understood that the aircraft may have more than two main engines and that accordingly more than two engine compartments may be provided. In the embodiment shown, the APU compartment 28 is located within a rear section of the fuselage 2 of the aircraft 1 and is separated from a remainder of the fuselage by a bulkhead 32a. The baggage bay 30 may be located anywhere within the cabin 2a and is separated from a remainder of the cabin by bulkhead(s) 32b, 32c.

The fire suppression system 20 includes first and second reservoirs 34 and 36 each containing a fire suppressant, which may be halon 1301 or any other suitable fire suppressant. Each reservoir 34, 36 is fluidly connected to both of the engine compartments 24, 26 for distribution of the fire suppressant to the engine compartments 24, 26. In a particular embodiment having each of the engine compartments 24, 26 connected to both of reservoirs 34, 36 provides a redundancy to the fire suppression system 20: if the first reservoir 34 cannot provide the required fire suppressant or was already discharged, the second reservoir 36 is used instead or in addition, and vice-versa. In the embodiment shown, each of the reservoirs 34, 36 contains the fire suppressant at a pressure to facilitate the discharge of the fire suppressant. A non-limiting example of pressures for the fire suppressant in the reservoirs 34, 36 is at least 200 psi.

Regulations and/or certification standards apply to the fire suppression requirements for a given fire zone. For example, the applicable regulations for baggage bays allow some baggage bays to use only a hand-held fire extinguisher H to achieve fire suppression. The regulations may require that baggage bays which rely only on a hand-held fire extinguisher H have a particular configuration, or satisfy a "reach requirement" (i.e, the reach of a crew member when fighting a fire from a door of the baggage bay). If the baggage bay does not have the prescribed configuration or reach requirement, then it may require additional fire suppression measures. Similarly, the regulations may require that baggage bays which rely only on a hand-held fire extinguisher H have a maximum volume. If the volume of the baggage bay exceeds the prescribed maximum volume, then it may require additional fire suppression measures.

In a particular embodiment of the fire suppression system 20 disclosed herein, the baggage bay 30 has a particular configuration, or has a particular volume, which exceeds the regulatory requirements. Therefore, it might be required that the baggage bay 30 have additional fire suppression means, such as for example, a connection of the baggage bay 30 to its own dedicated reservoir of fire suppressant. For example, in a particular embodiment, the maximum acceptable volume for which a crew member is able to extinguish a fire using only a hand-held fire extinguisher H by standing in the opening 30a of the baggage bay 30 is defined by the applicable regulations to be 200 cubic feet. Accordingly, in this example, the baggage bay 30 has a volume of more than the maximum volume defined in the applicable regulations, and thus would require an additional means of fire suppression. However, and as explained in greater detail below, the fire suppression system 20 allows this more voluminous baggage bay 30 to avoid having its own dedicated reservoir of fire suppressant.

In a particular embodiment, the fire suppression system 20 is modified from an existing system where both reservoirs 34, 36 are connected to the engine compartments 24, 26 and to the APU compartment 28, and where the baggage bay 30 has a volume exceeding the maximum volume for which the use of a hand-held fire extinguisher H is sufficient and is accordingly fed by a dedicated fire suppressant reservoir fluidly connected to the baggage bay 30. It has been found that one of the redundancies of providing the fire suppressant to the APU compartment 28 can be omitted, and that one of the reservoirs 34, 36 can instead be used to distribute the fire suppressant to the baggage bay 30. Accordingly, the fire suppression system 20 may result in the omission of the dedicated fire suppression reservoir for the baggage bay 30, which may allow for a reduction in weight, production time and/or cost for the fire suppression system 20.

In the embodiment shown, the first reservoir 34 is thus connected with the APU compartment 28 for distribution of the fire suppressant thereto, and the second reservoir 36 is connected with the baggage bay 30 for distribution of the fire suppressant thereto. As such, each reservoir 34, 36 is fluidly connected to only a respective one of the APU compartment 28 and the baggage bay 30. In the embodiment of FIG. 2, the fire zone defined by the APU compartment 28 is fluidly separated from the second reservoir 36, and the fire zone defined by the baggage bay 30 is fluidly separated from the first reservoir 34. There is no conduit fluidly connecting the APU compartment 28 to the second reservoir 36, no conduit fluidly connecting the baggage bay 30 to the first reservoir 34, and fluid communication through the reservoirs 34, 36 is prevented by the pressure within the reservoirs 34, 36 and/or the configuration of their outlets.

In a particular embodiment, having the baggage bay 30 connected to one of the reservoirs 34, 36 allows for an increase in the volume of the baggage bay 30 beyond the maximum volume for which the use of a hand-held fire extinguisher H is sufficient, without requiring a dedicated reservoir of fire suppressant for the increased-volume baggage bay 30. In the embodiment shown, the volume of the baggage bay 30 is greater than 200 cubic feet.

In the embodiment shown, the first reservoir 34 has a first outlet 34a connected to the first engine compartment 24, a second outlet 34b connected to the second engine compartment 26, and a third outlet 34c connected to the APU compartment 28.

The second reservoir 36 has a first outlet 36a connected to the first engine compartment 24, a second outlet 36b connected to the second engine compartment 26, and a third outlet 36c connected to the baggage bay 30. Each of the outlets 34a-c, 36a-c is normally closed, and operable when distribution of fire suppressant is required. For example, in a particular embodiment, a pyrotechnic capsule, or squib is provided in each outlet 34a-c, 36a-c, which, once detonated, opens the outlet and allows the fire suppressant to exit the reservoirs 34, 36. The outlets 34a-c, 36a-c are configured to prevent flow into the respective reservoir therethrough.

In the embodiment shown, the system 20 further includes a first fitting 50 and a second fitting 52 for connecting the reservoirs 34, 36 to the engine compartments 24, 26, which may be for example T-shaped. Each fitting 50, 52 has two inlets 50a, 52a fluidly communicating with an outlet 50b, 52b. One inlet 50a of the first fitting 50 is fluidly connected to the first outlet 34a of the first reservoir 34 and the other inlet 50a of the first fitting 50 is fluidly connected to the first outlet 36a of the second reservoir 36. The outlet 50b of the first fittings 50 is fluidly connected to the first engine compartment 24. One inlet 52a of the second fitting 52 is fluidly connected to the second outlet 34b of the first reservoir 34 and the other inlet 52a of the second fitting 52 is fluidly connected to the second outlet 36b of the second reservoir 36. The outlet 52b of the second fitting 52 is fluidly connected to the second engine compartment 26. Suitable conduits 54 configured for receiving the fire suppressant are used to connect the outlets 34a, 34b, 36a, 36b of the reservoirs 34, 36 to the fittings 50, 52, and to connect the fittings 50, 52 to the engine compartments 24, 26. Another suitable conduit 55 is used to connect the third outlet 34c of the first reservoir 34 directly with the APU compartment 28.

Still referring to the embodiment of FIG. 2, the air pressure in the engine compartments 24, 26 is less than that in the baggage bay 30. For example, the air pressure within the engine compartments 24, 26 may correspond to the outside air pressure of an environment E around the aircraft 1. The baggage bay 30, in contrast, is pressurized so as to be accessible from the cabin during flight. Both reservoirs 34, 36 are sized and configured to provide fire suppressant to both engine compartments 24, 26. Stated differently, both reservoirs 24, 26 are sized to discharge a given quantity of fire suppressant in a given period of time dependent on the volume and flow characteristics of the engine compartments 24, 26. The pressure in one of the reservoirs 34 corresponds to that in the other reservoir 36, i.e. the pressure in both reservoirs 34, 36 is similar or the same. Since the reservoirs 34, 36 are sized for both engine compartments 24, 26, the discharge pressure and/or the given quantity of fire suppressant from the reservoirs 34, 36 may be too high for the baggage bay 30. Therefore, the system 20 further includes a restrictor 40 configured for lowering a discharge pressure of the fire suppressant being delivered to the baggage bay 30. This helps to "slow down" the fire suppressant supplied to the baggage bay 30. The baggage bay 30 is thus connected to the third outlet 36c of the second reservoir 36 through the restrictor 40. The restrictor 40 is positioned so that the engine compartments 34, 36 are fed independently/separately from the restrictor 40, i.e. the restrictor 40 does not affect the pressure of the fire suppressant being delivered to the engine compartments 34, 36. In a particular embodiment, the APU compartment 28 is not pressurized, and accordingly no restrictor is provided between the first reservoir 34 and the APU compartment 28.

Figure 3:
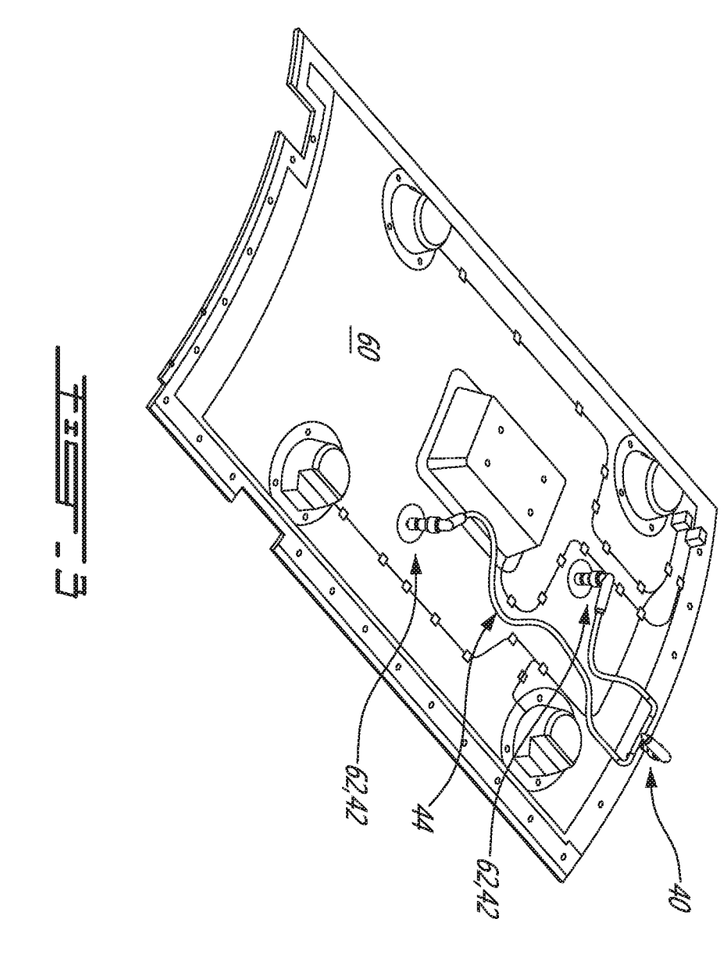
FIG. 3 is a schematic tridimensional view of a panel of a baggage bay of the aircraft of FIG. 1, in accordance with a particular embodiment.
Figure 4:
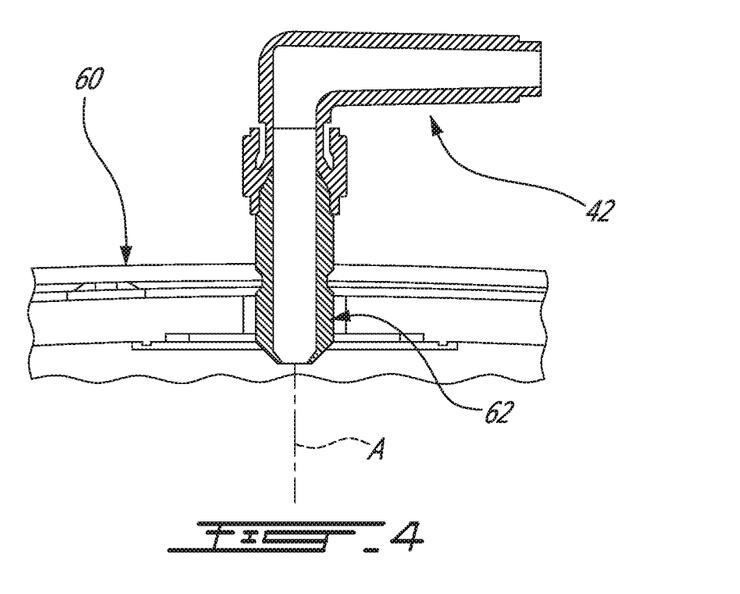
FIG. 4 is a schematic cross-sectional view of a nozzle of the fire suppression system of FIG. 2 configured to be affixed to the panel of FIG. 3, in accordance with a particular embodiment.

Referring to FIGS. 2-4, the system 20 further comprises two nozzles 42 for delivering the fire suppressant to the baggage bay 30. A panel 60 (FIG. 3) defining a roof or ceiling of the baggage bay 30 has two apertures 62 defined therethrough, each sealingly receiving one of the nozzles 42 extending therethrough. The nozzles 42 are spaced apart from each other so as to allow distribution of the fire suppressant within the baggage bay 30. Suitable conduits 44 (FIG. 2) connect the third outlet 36c of the second reservoir 36 to the nozzles 42 via the restrictor 40. Referring particularly to FIG. 4, in the embodiment shown, the nozzles 42 are L-shaped. An exit flow axis A of each of the nozzles 42 is oriented away from the panel 30 and toward a floor of the baggage bay 30. The exit flow axis A is oriented substantially perpendicularly or normal to a surface of the panel 30 at the location of the corresponding nozzle 42. Other configurations are possible, including, but not limited to, configurations including a single nozzle or more than two nozzles, or other types of discharge features such as tubes.

The fire suppressant increases in volume when it exits the reservoirs 34, 36. Therefore, a pressure inside the baggage bay 30 increases upon releasing the fire suppressant. Referring back to FIG. 2, in the embodiment shown, the system 20 further includes a pressure-relief valve 46 for releasing pressure from the baggage bay 30. The pressure-relief valve 46 has an inlet 46a connected to the baggage bay 30 and an outlet 46b connected to a region outside the baggage bay 30, such as the environment E around the aircraft 1. In an alternative embodiment, the outlet 46b is connects the baggage bay 30 to the underfloor during normal aircraft operation to allow for ventilation of the accessible baggage bay 30. The pressure-relief valve 46 has an opened configuration and a closed configuration. The pressure-relief valve 46 allows fluid flow communication between the baggage bay 30 and the region E outside the baggage bay 30 through the pressure-relief valve 46 in the opened configuration to limit the pressure differential of the baggage bay 30 with respect to adjacent compartments. The pressure-relief valve 46 blocks fluid flow communication therebetween in the closed configuration. During normal operation of the aircraft 1, the pressure-relief valve 46 is in the closed configuration. The opening of the pressure-relief valve 46 is coordinated with the release of the fire suppressant from the reservoir 36 into the baggage bay 30 so as to limit the pressure increase within the baggage bay 30 to an acceptable level.

In an embodiment, the pressure-relief valve 46 is part of a Baggage Bay Shut-Off Valve (referred to as "BBSOV"). Air enters the baggage bay 30 via the BBSOV through an inlet port of the BBSOV from the normal aircraft air distribution. An outlet port of the BBSOV fluidly connects the baggage bay 30 to an underfloor to allow for ventilation of the baggage bay 30. The inlet port of the BBSOV is closed following smoke detection to cut the air flow into the baggage bay 30. The outlet port of the BBSOV is kept open during a period following the discharge of fire suppressant to limit the pressure differential of the baggage bay 30 with respect to adjacent compartments. Limiting the pressure differential may also help to protect liners in the baggage bay 30, and may also prevent existing decompression blow-out features from inadvertently activating.

In a particular embodiment, the discharge time of the second reservoir 36 and the time before opening the pressure-relief valve 46 are adjusted so that the pressure increase caused by the discharge of the fire suppressant in the baggage bay 30 is at most 0.2 PSI (i.e. pressure of at most 0.2 PSID). Therefore, in a particular embodiment, the restrictor 40 allows for time for discharging the fire suppressant in the baggage bay 30 to be higher than the time for discharging the fire suppressant in the engine compartments 24, 26. In a particular embodiment, the discharge time for the baggage bay 30 is selected so that the initial concentration of the fire suppressant in the baggage bay 30 is at least 5% following the discharge of the fire suppressant and is maintained to at least 3% for two minutes thereafter. After the two minutes, and if required, the crew member extinguishes the fire with the hand held extinguisher H, which may be disposed proximate to the baggage bay opening 30a. Other values for the discharge time and the concentration of fire suppressant are also possible.

In a particular embodiment, the system 20 may allow for a reduction of parts, costs, and/or weight because the fire suppression system 20 does not require a dedicated reservoir for the baggage bay 30. Hence, in-service maintenance inspection of the aircraft 1 may be reduced because there is one less reservoir to inspect compared to other aircraft having a dedicated reservoir of fire suppressant for the baggage bay. Furthermore, in a particular embodiment, having one less reservoir allows for a reduction of the fire suppressant contained within the aircraft 1. In a particular embodiment, this may be environmentally beneficial because the fire suppressant may be detrimental for the environment.

Figure 5:
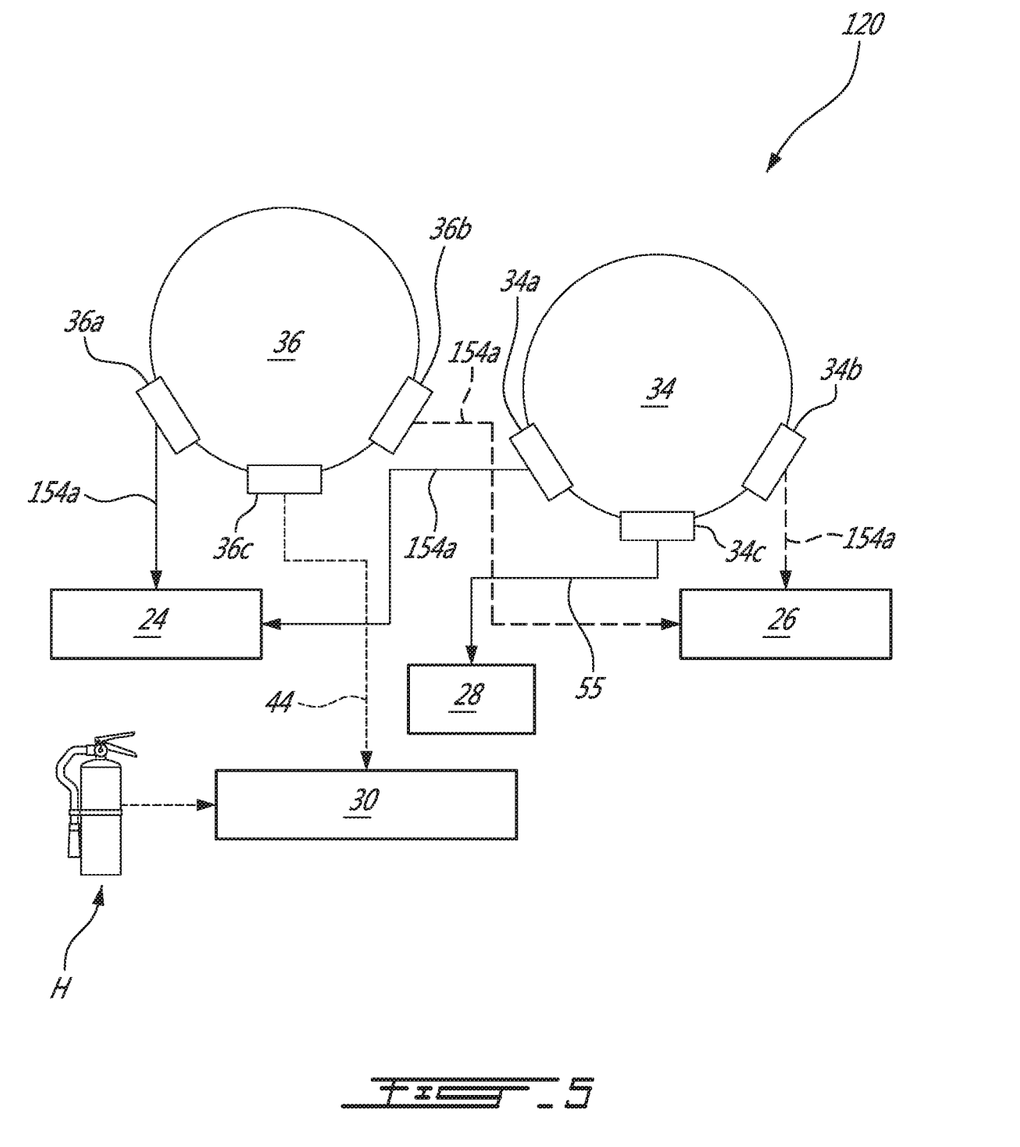
FIG. 5 is a schematic view of a fire suppression system of the aircraft of FIG. 1 in accordance with another particular embodiment.

Referring now to FIG. 5, a fire suppression system 120 in accordance with another particular embodiment is shown, where elements similar to that of the fire suppression system 20 are identified by the same reference numerals and will not be further described herein. In this embodiment, the fittings are omitted. The first outlets 34a, 36a of the compartments 34, 36 are each directly connected to the first engine compartment 24 and the second outlets 34b, 36b of the compartments 34, 36 are each directly connected to the second engine compartment 26, via suitable conduits 154a. Other configurations are also possible.

In a particular embodiment and in use, the fire suppressant system 20 is connected by fluidly connecting each of the engine compartments 24, 26 to both reservoirs 34, 36 of fire suppressant. The APU compartment 28 is fluidly connected only to the first reservoir 34, i.e. fluidly connected to the first reservoir 34 without being fluidly connected to the second reservoir 36. The baggage bay 30 is fluidly connected only to the second reservoir 36, i.e. fluidly connected to the second reservoir 36 without being connected to the first reservoir 34. In other words, the system 20 is connected such that no fluid communication occurs between the APU compartment 28 and the second reservoir 36, and between the baggage by 30 and the first reservoir 34.

In the embodiment shown, connecting the fire suppressant system 20 further includes connecting the first engine compartment 24 to the first outlets 34a, 36a of the reservoirs 34, 36, and connecting the second engine compartment 26 to the second outlets 34b, 36b of the reservoirs 34, 36. The APU compartment 28 is connected to the third outlet 34c of the first reservoir 34 and the baggage bay 30 is connected to the third outlet 36c of the second reservoir 36.

In the embodiment shown, the second reservoir 36 is connected to the baggage bay 30 via the restrictor 40 such that fluid communication between the baggage bay 30 and the second reservoir 36 is performed through the restrictor 40 to lower the pressure of the fire suppressant circulating therethrough.

In the embodiment shown, connecting the baggage bay 30 with the second reservoir 36 further comprises connecting the second reservoir 36 with the nozzles 42 in fluid communication with the baggage bay 30 to disperse the fire suppressant within the baggage bay 30.

In the embodiment shown, a selective fluid communication between the baggage bay 30 and a region outside the baggage bay is provided for limiting a pressure increase in the baggage bay 30 when the second reservoir 36 injects the fire suppressant in the baggage bay 30. In the embodiment shown, the pressure-relief valve 46 is used for that purpose.

The above description is meant to be exemplary only, and one skilled in the art will recognize that changes may be made to the embodiments described without departing from the scope of the disclosure. Modifications which fall within the scope of the disclosure will be apparent to those skilled in the art, in light of a review of this disclosure, and such modifications are intended to fall within the appended claims.

The invention claimed is:

1. A combination of a fire suppression system and an aircraft, comprising:
   first, second, third, and fourth fire zones, an air pressure in the first and the second fire zones less than an air pressure in the fourth fire zone;
   first and second reservoirs each containing a fire suppressant and each having a first outlet fluidly connected to the first fire zone, a second outlet fluidly connected to the second fire zone, and a third outlet, the third outlet of the first reservoir is only fluidly connected to the third fire zone and is permanently fluidly separated from the first, second and fourth fire zones, the third outlet of the second reservoir is only fluidly connected to the fourth fire zone and is permanently fluidly separated from the first, second and third fire zones;
   wherein the third fire zone is fluidly separated from the second reservoir and the fourth fire zone is fluidly separated from the first reservoir;
   wherein the first fire zone comprises a first engine compartment receiving a first main engine of the aircraft;
   wherein the second fire zone comprises a second engine compartment receiving a second main engine of the aircraft;
   wherein the third fire zone comprises an auxiliary power unit compartment receiving an auxiliary power unit of the aircraft; and
   wherein the fourth fire zone comprises a baggage bay within a cabin of the aircraft.

2. The combination of claim 1, wherein the fourth fire zone is connected to the third outlet of the second reservoir through a restrictor configured for lowering a pressure of the fire suppressant circulating therethrough.

3. The combination of claim 1, further comprising a first fitting and a second fitting, the first and second fittings each having a first inlet connected to the first reservoir, a second inlet connected to the second reservoir, and an outlet connected to a respective one of the first and second fire zones.

4. The combination of claim 1, wherein the fourth fire zone is connected to the third outlet of the second reservoir through spaced apart nozzles in fluid communication with the fourth fire zone.

5. The combination of claim 1, further comprising a pressure-relief valve having an inlet connected to the fourth fire zone and an outlet connected to a region around the fourth fire zone, the pressure-relief valve having an opened configuration and a closed configuration, the pressure-relief valve allowing fluid flow communication between the fourth fire zone and the region through the pressure-relief valve in the opened configuration and blocking fluid flow communication therebetween in the closed configuration.

6. The combination of claim 1, wherein a volume of the fourth fire zone is at least 200 cubic feet.

7. The combination of claim 1, wherein the fourth fire zone is accessible from within a cabin of the aircraft and configured to be pressurized during flight.

* * * * *